US012680570B2

(12) United States Patent
Stewart et al.

(10) Patent No.: US 12,680,570 B2
(45) Date of Patent: Jul. 14, 2026

(54) MULTI-PIECE FASTENER INCLUDING A SHELL

(71) Applicant: AlphaUSA, Livonia, MI (US)

(72) Inventors: Robert E. Stewart, Farmington Hills, MI (US); Catherine Strumbos, Bloomfield Hills, MI (US); Thomas Strangway, Bloomfield Hills, MI (US); Brian Nau, Bloomfield Hills, MI (US); Richard J. Anton, Northville, MI (US)

(73) Assignee: ALPHAUSA, Livonia, MI (US)

( * ) Notice: Subject to any disclaimer, the term of this patent is extended or adjusted under 35 U.S.C. 154(b) by 477 days.

(21) Appl. No.: 18/362,050

(22) Filed: Jul. 31, 2023

(65) Prior Publication Data

US 2025/0043814 A1      Feb. 6, 2025

(51) Int. Cl.
*F16B 41/00*       (2006.01)
*F16B 37/00*       (2006.01)
*F16B 43/00*       (2006.01)

(52) U.S. Cl.
CPC ............ *F16B 41/002* (2013.01); *F16B 37/00* (2013.01); *F16B 43/00* (2013.01)

(58) Field of Classification Search
CPC ............................... F16B 43/00; F16B 41/002
USPC ......................................................... 411/533
See application file for complete search history.

(56) References Cited

U.S. PATENT DOCUMENTS 2,225,654 A    12/1940   Olson
2,679,880 A    6/1954    Poupitch 2,779,375 A    1/1957    O'Connor
3,342,235 A    9/1967    Pylypyshyn
3,800,396 A *  4/1974    Puchner .................. F16B 39/26
                                                   206/338
3,921,687 A    11/1975   Stencel
4,969,788 A *  11/1990   Goiny ..................... F16B 43/00
                                                   411/533
4,971,498 A    11/1990   Goforthe
4,986,712 A    1/1991    Fultz
(Continued)

FOREIGN PATENT DOCUMENTS

EP          0129455 A1    12/1984
GB          2343228 A     5/2000

OTHER PUBLICATIONS

Written Opinion corresponding to application PCT/US2024/040116, dated Dec. 10, 2024, 9 pages.

(Continued)

*Primary Examiner* — Flemming Saether
(74) *Attorney, Agent, or Firm* — Reising Ethington P.C.

(57) ABSTRACT

A fastener comprising a nut, a washer, and a shell that axially retains the nut and the washer together. In one embodiment, the shell axially retains the nut and the washer together, and has a lower wall axially retaining the washer to the nut in a first direction, and a s-shaped section retaining the nut to the washer in a second direction. In another embodiment, the shell has a bent section and a lower wall extending axially away from the bent section. The lower wall of the bent section retains the washer to the shell. In yet another embodiment, the shell comprises a base wall including a first bend, a first skirt depending away from the first bend, a second bend extending away from the second bend, a third bend extending away from the second bend, and a second skirt depending away from the third bend.

23 Claims, 3 Drawing Sheets

(56)  References Cited

U.S. PATENT DOCUMENTS

| | | | |
|---|---|---|---|
| 5,085,550 A | | 2/1992 | Kendrick |
| 5,203,656 A | * | 4/1993 | McKinlay ............... F16B 39/24 |
| | | | 411/533 |
| 5,393,183 A | | 2/1995 | Hinton |
| 5,904,460 A | | 5/1999 | Kawabata |
| 6,039,524 A | | 3/2000 | McKinlay |
| 6,074,148 A | * | 6/2000 | Wilson .................... F16B 37/14 |
| | | | 411/533 |
| 6,554,552 B2 | * | 4/2003 | McKinlay ............... F16B 39/26 |
| | | | 411/533 |
| 6,592,314 B1 | * | 7/2003 | Wilson .................... F16B 37/14 |
| | | | 411/533 |
| 6,676,345 B2 | * | 1/2004 | Szczukowski ........ F16B 5/0275 |
| | | | 411/533 |
| 6,769,852 B2 | | 8/2004 | Nilsen et al. |
| 6,802,681 B2 | * | 10/2004 | Cheal ........................ F16B 5/02 |
| | | | 411/429 |
| 6,896,465 B2 | | 5/2005 | Andersson |
| 6,899,503 B2 | | 5/2005 | Anderson et al. |
| 6,908,276 B2 | | 6/2005 | Dohm |
| 6,961,987 B2 | | 11/2005 | Nilsen et al. |
| 7,192,234 B2 | | 3/2007 | Anderson et al. |
| 2007/0080088 A1 | * | 4/2007 | Trotter .................. F16B 41/002 |
| | | | 206/497 |
| 2011/0182692 A1 | | 7/2011 | Reid et al. |
| 2012/0003061 A1 | * | 1/2012 | Hill ......................... F16B 19/02 |
| | | | 411/531 |
| 2015/0086290 A1 | | 3/2015 | Bisset et al. |
| 2017/0082133 A1 | * | 3/2017 | Grosick ............... F16B 41/002 |
| 2022/0018382 A1 | | 1/2022 | Disantis |

OTHER PUBLICATIONS

International Search Report corresponding to application PCT/US2024/040116, dated Dec. 10, 2024, 4 pages.
Combined Search and Examination Report corresponding to application GB2411289.8, dated Dec. 18, 2024, 6 pages.

* cited by examiner

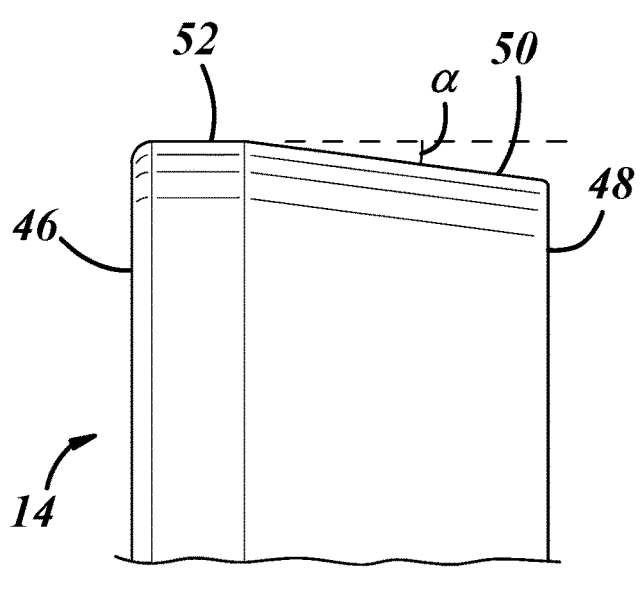
_FIG. 5_
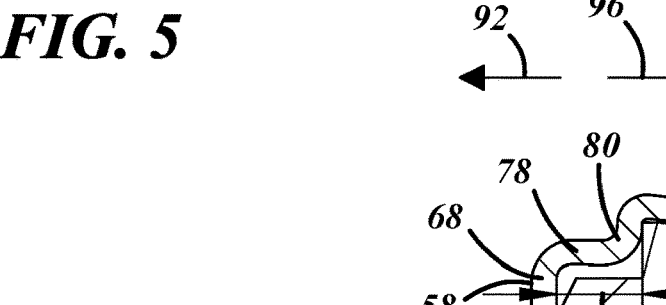
_FIG. 6_
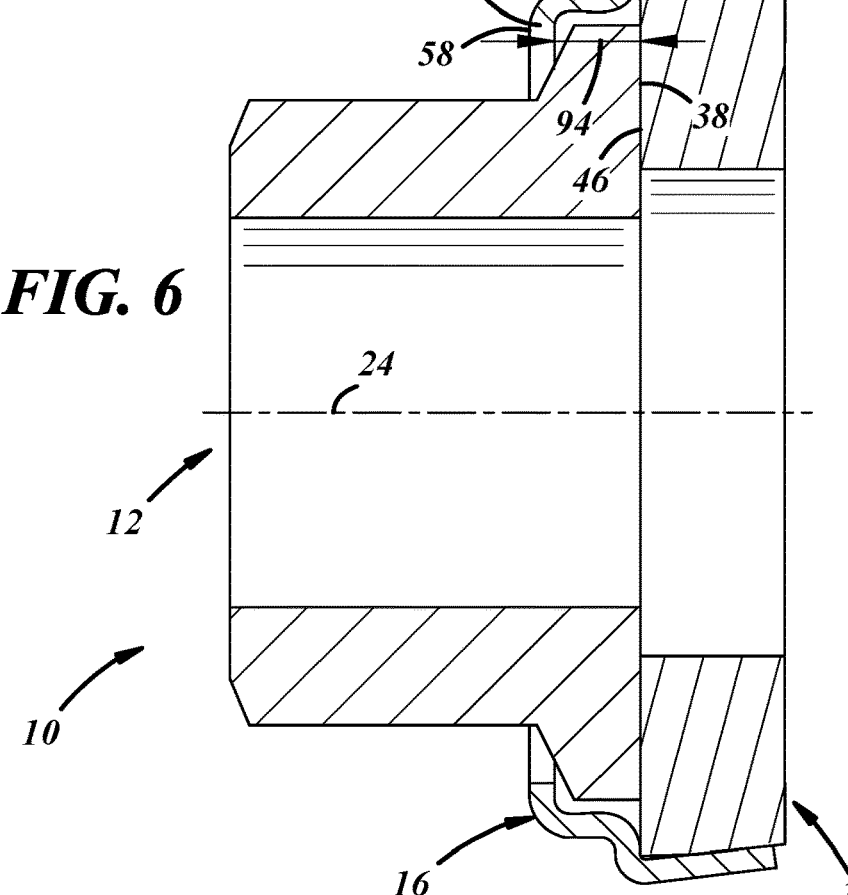

MULTI-PIECE FASTENER INCLUDING A SHELL

TECHNICAL FIELD

This disclosure relates generally to fasteners, and more specifically to fasteners including nuts and washers.

BACKGROUND

Fasteners, such as nuts and washers, are used in many industries. And some fasteners are adapted for use with rotatable couplings, which are used for coupling components together with a bolt or screw, for example. In a general example, some fasteners include a hexagonal flange nut having an added collar (i.e., a non-standard nut). Additionally, the fasteners may include a non-standard washer that has a stepped inside diameter. The fastener is assembled such that the collar on the nut is inserted through the stepped hole of the washer and flared to secure (e.g., swag or stake) the washer and nut together. It is costly to manufacture the collar on the nut and the stepped portion on the washer. This arrangement also reduces the amount of bearing surface available to achieve proper clamp load during run-down of the fastener. In addition, it is challenging to assemble the modified nut and washer so that the fastener can be used in areas with restricted clearances.

SUMMARY

In one embodiment of the present disclosure, a fastener comprising a nut including a head, a flange extending radially away from the head, and a nut through hole having a central axis extending therethrough. The fastener further comprising a washer including a washer through hole coaxial with the nut through hole of the nut, a first surface adjacent the flange of the nut, a second surface, and a breakaway surface extending between the first and second surfaces. The fastener further comprising a shell axially retaining the nut and the washer together, and including an inner surface, an outer surface, a top surface including a through hole about the central axis, a bottom surface, a lower wall extending upwardly from the bottom surface toward the top surface, the lower wall axially retaining the washer to the nut in a first direction. The shell further comprising a s-shaped section extending between the top surface and the lower wall, including an upper portion defining part of the top surface and retaining the nut to the washer in a second direction, a lower portion extending from the lower wall and contacting the first surface of the washer, and a middle portion between the upper portion and lower portion.

In another embodiment of the present disclosure, a fastener comprising a nut including a head, a flange extending away from the head and including an upper surface and a lower surface, and a nut through hole having a central axis extending therethrough. The fastener further comprising a washer including a first surface and a second surface, the first surface being adjacent the lower surface of the nut. The fastener further comprising a shell including a bent section, comprising an upper portion retaining the nut within the shell, a lower portion adjacent to and in contact with the first surface of the washer, and a middle portion extending between the upper portion and lower portion. The shell further including a lower wall extending axially away from the lower portion of the bent section, the lower wall and lower portion of the bent section retaining the washer to the shell.

In yet another embodiment of the present disclosure, a washer and nut retention shell, comprising a base wall including an upper surface, a lower surface, and a base wall inner diameter extending between the upper and lower surfaces, a first bend extending away from the base wall. The washer and nut retention shell further comprising a first skirt depending away from the first bend and including a first skirt inner diameter greater in size than the base wall inner diameter and a first skirt outer diameter. The washer and nut retention shell further comprising a second bend extending away from the first skirt and a third bend extending away from the second bend. The washer and nut retention shell further comprising a second skirt depending away from the third bend and including a second skirt inner diameter greater than the first skirt outer diameter and a second skirt outer diameter.

BRIEF DESCRIPTION OF THE DRAWINGS

FIG. 5 is a further enlarged, fragmentary perspective view of the washer of the fastener shown in FIG. 1; and FIG. 6 is a cross-sectional view of the fastener shown in FIG. 1, wherein the shell is retained to the nut and the washer.

DETAILED DESCRIPTION

Figure 1:
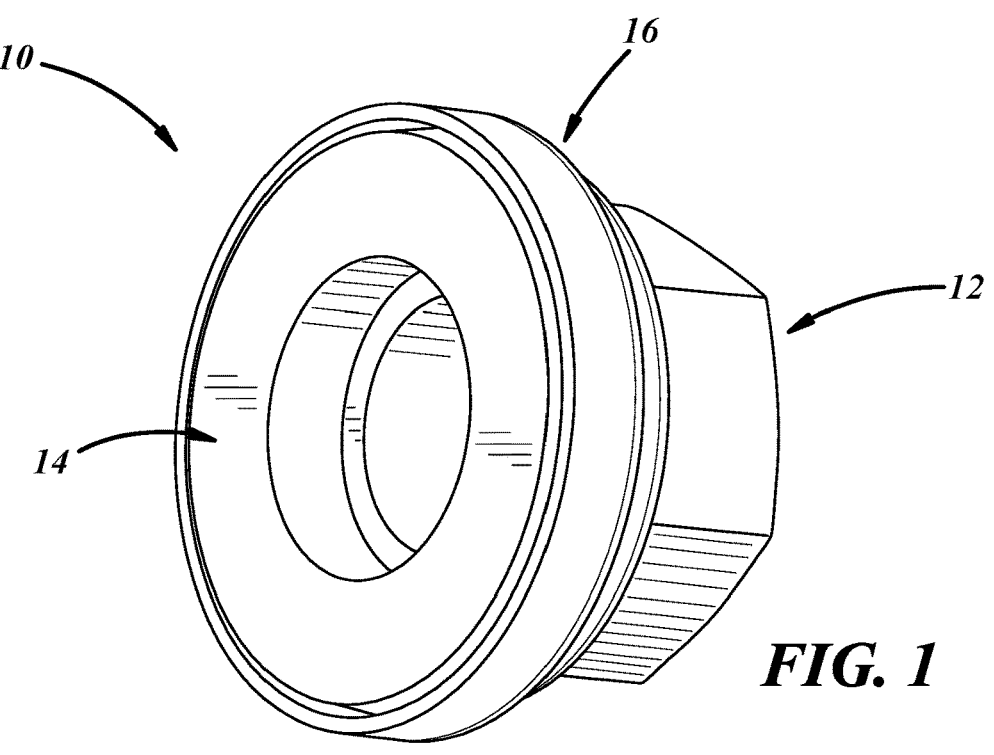
FIG. 1 is a perspective view of an illustrative embodiment of a fastener including a nut, a washer, and a shell.

With specific reference to the drawing figures, FIG. 1 shows an illustrative embodiment of a fastener 10 comprising a nut 12, a washer 14, and a shell 16 circumscribing portions of both the nut 12 and the washer 14. The shell 16 may axially retain the nut 12 and the washer 14 together while still allowing the nut 12 to freely rotate within the shell 16 and with respect to the washer 14 and the shell 16.

Figure 2:
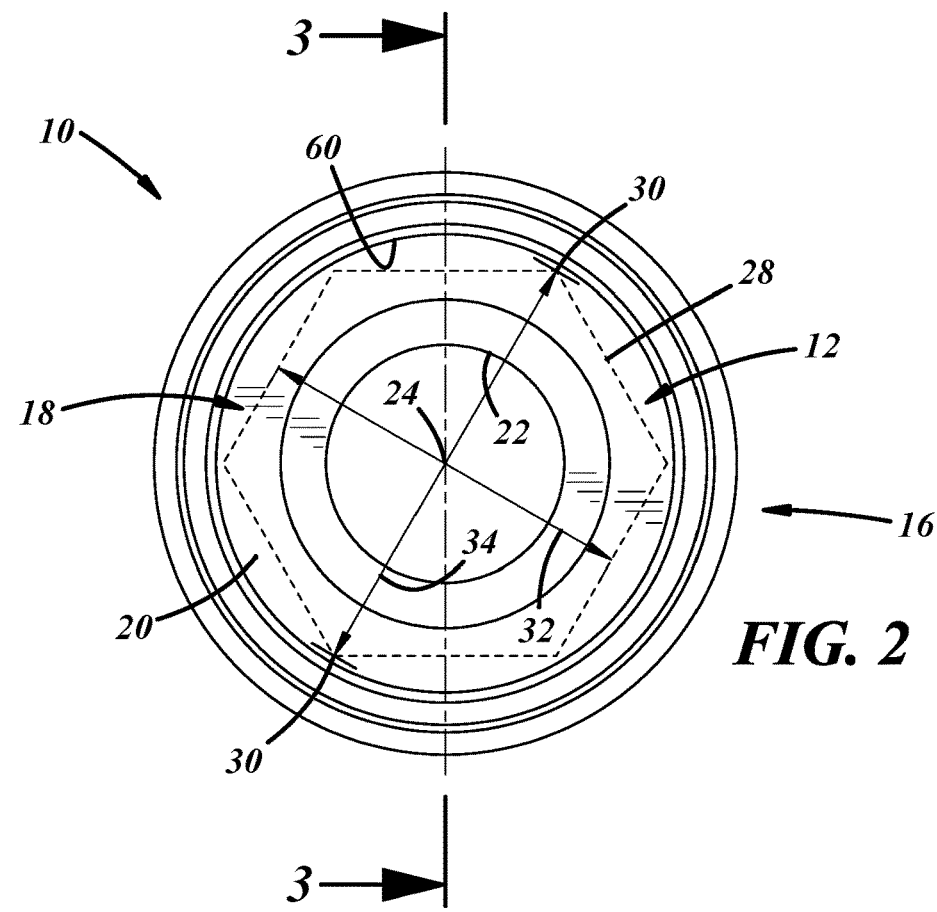
FIG. 2 is a top view of the fastener of FIG. 1.
Figures 3, 4:
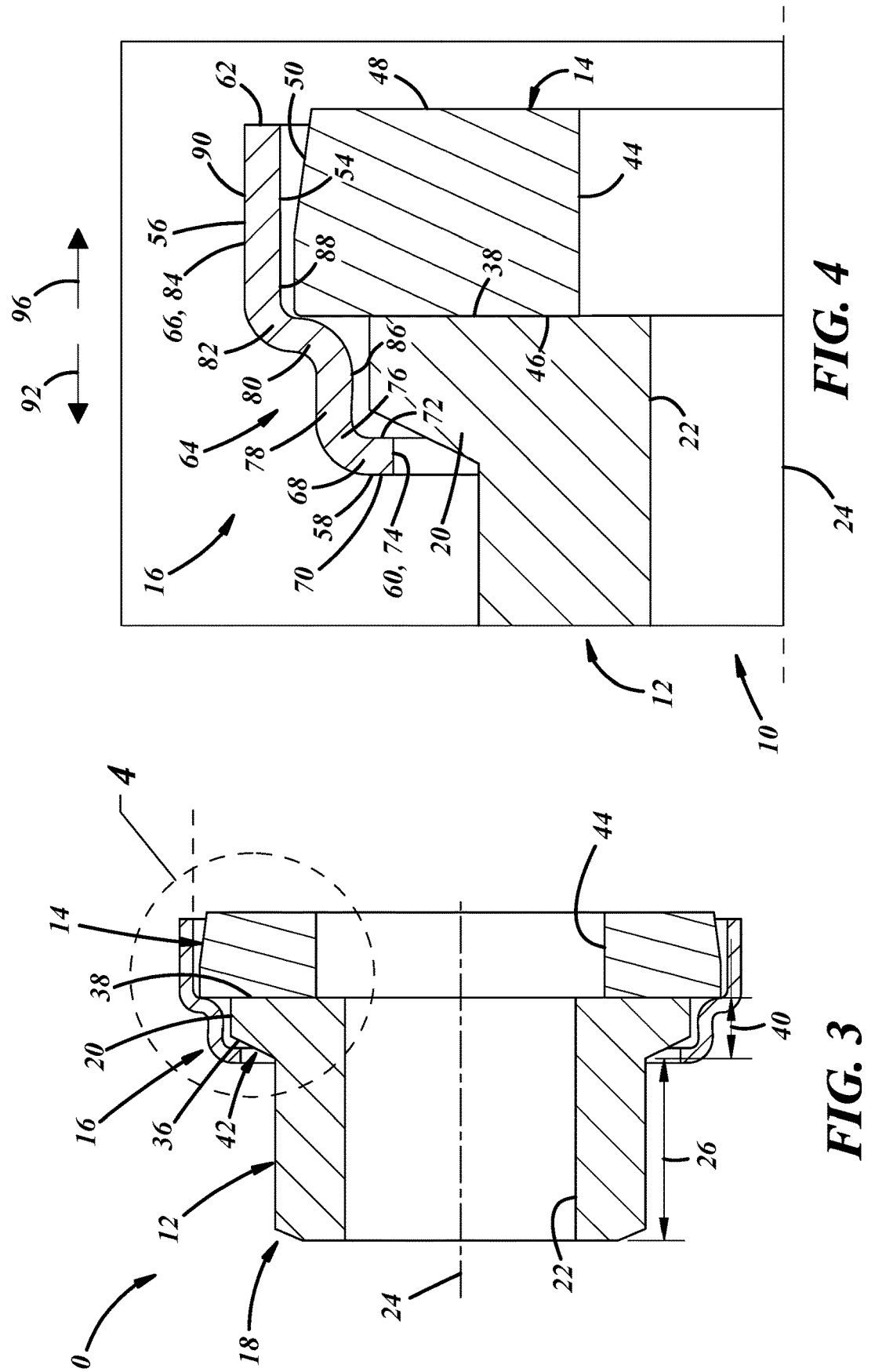
FIG. 3 is a cross-sectional view of the fastener of FIG. 1, taken along line 2-2 shown in FIG. 2.
FIG. 4 is an enlarged, fragmentary cross-sectional view of the fastener shown in FIG. 1.

With reference to FIGS. 2 and 3, the nut 12 includes a head 18, a flange 20 extending radially away from the head 18, and a nut through hole 22 having a central axis 24 therethrough. In the present illustrative embodiment, the nut 12 is a standard fastener nut, such as property class 10 hex flange nut, and the nut through hole 22 is a threaded nut through hole. "Standard nut" means that the nut 12 is not modified to include a boss, a collar, or a spigot extending from the nut 12. An example of a non-standard nut is included in a KEPS® nut (i.e., k-lock nut or washer nut). In at least one embodiment, the head 18 of the nut 12 may be a hexagonal or square shape or another shape that is suitable for fastening, for example. The head 18 includes a wrenching thickness 26 (i.e., height) (FIG. 3) and may include flats 28 (FIG. 2) and corners 30 (FIG. 2). As show in FIG. 2, the head 12 has a width across parallel flats 32 and a width across opposite corners 34. It may be desirable for the width across the corners 34 of the nut 12 to be substantially the same (discussed in more detail below) for each pair of corners 30 on the head 18. As shown in FIGS. 2 and 3 the flange may include an upper surface 30 and a lower surface 32 and a thickness 40 between the upper surface 36 and the lower surface 32. Additionally, the thickness between the upper and lower surfaces 36, 32 may gradually increase toward the central axis so as to form a frustrum 42 (i.e., shoulder), for example, as shown in FIGS. 3 and 4. In at least one embodiment, the flange 20 may include one or more markings, such as embossed or engraved markings, to indicate certain standards and/or certifications associated with the nut 12. The nut 12 includes a nut thickness (i.e., a nut height) that may be defined as the sum of a wrenching thickness 26 and the flange thickness 40, as shown in FIG. 3. At least a portion of the lower surface 38 of the flange 20 may contact or be adjacent to the washer 14.

With reference to FIG. 3, the washer 14 is provided and may contact an irregular machined surface and also provide a smooth and uniform bearing surface for the flange 20 of the nut 12 to mate against for consistent run-down friction during fastening. The washer 14 may be stamped from steel, aluminum, stainless steel, an alloy, or another material that is suitable to form a thick stamped washer capable of withstanding fluctuations in temperature, for example. The washer 14 includes a through hole 44 that may be coaxial with the nut through hole 22 of the nut 12. Additionally, in the present illustrative embodiment, the through hole 44 of the washer 14 includes a substantially uniform inner diameter that is slightly greater than that of the nut through hole 22, and the through hole 44 does not include a stepped portion. In other words, the diameter of the through hole 44 of the washer 14 may be greater than the diameter of the nut through hole 22 by ⅟₁₂₈ to ⅟₁₆ of an inch including all ranges, sub-ranges, endpoints, and values in that range.

With reference to FIGS. 4 and 5, the washer 14 may include a first surface 46 adjacent the flange 20 of the nut 12, a second surface 48, and a breakaway surface 50 extending between the first and second surfaces 46, 48. The washer 14 includes a thickness between the first surface 46 and the second surface 48. In at least one embodiment, the washer 14 may also include a cylindrical portion 52 that extends between the first surface 46 and the breakaway surface 50, as shown in FIG. 5. The cylindrical portion 52 of the washer 14 may be desirable to help maintain concentricity of the through hole 44 of the washer 14 and the shell 16 (discussed in more detail below). The breakaway surface 50 may be angled inwardly from the cylindrical portion 52 toward the central axis 24 (FIG. 3) and this may be desirable so that a portion of the shell 16 can be manipulated to retain the nut 12 and washer 14 within the shell 16. In the present illustrative embodiment, an angle α of the breakaway surface may be measured with respect to a radially outermost portion of the washer 14. The radially outermost portion of the washer may be at the diameter of the cylindrical portion 52 of the washer 14, for example. The angle α of the breakaway surface 50 may range between 0.01 and 30 angular degrees including all ranges, sub-ranges, endpoints, and values in that range, or have another suitable angle or shape that allows the shell 16 to be reliably retained on the washer 14 and prevent inadvertent disassembly of the fastener 10. Ordinarily, the target angle for angle α is between 0 and 10, but it may be desirable for the angle to be greater than 5 annular degrees and less than 30 annular degrees. The angle may be between 10 and 30 degrees, greater than 30 degrees, less than 30 degrees or between 12 and 28 degrees. The first surface 46, cylindrical surface 52, and/or the breakaway surface 50 may maintain or periodically contact the shell 16 at one or more areas of the shell 16.

With reference again to FIG. 4, the shell 16 is provided to axially retain the nut 12 and washer 14 so that the nut 12 may freely rotate about the central axis 24 with respect to the washer 14 and the shell 16. The shell 16 includes an inner surface 54 (e.g., radially inner surface) and an outer surface 56 (e.g., radially outer surface), a top surface 58 including a through hole 60 about the central axis 24, and a bottom surface 62. The shell 16 extends between the top surface 58 and the bottom surface 62 and may include a bent section 64 (e.g., a double-bent or s-shaped section) and a lower wall 66 extending upwardly from the bottom surface 62 toward the top surface 58. The shell 16 may include a base wall 68 (i.e., an upper portion of the s-shaped section) that includes an upper surface 70, a lower surface 72, and a base wall inner diameter 74 extending between the upper and lower surfaces 70, 72. A first bend 76 may depend away from the base wall 68 and may be arranged axially between the base wall 68 and a first skirt 78 (i.e., a middle portion of s-shaped section) that extends away from the first bend 76. The shell 16 may further include a second bend 80 (i.e., a lower portion of the s-shaped section) that depends away from the first skirt 78. A third bend 82 may depend away from the second bend 80 and may be arranged between the second bend 80 and a second skirt 84 (i.e., the lower wall). The first skirt 78 may include a first skirt inner diameter 86 that is greater in size than the base wall inner diameter 74 (i.e., through hole diameter). Additionally, the second skirt 84 may include a second skirt inner diameter 88 that is greater than the first skirt inner diameter 88. The second skirt 84 may also include a second skirt outer diameter 90. As shown in FIG. 4, the bottom surface 62 of the shell may be axially recessed (i.e., axially short of) with respect to the second surface of the washer.

In assembly or upon manufacturing, the fastener 10 may include and/or maintain various clearances, gaps, and/or contact areas so the nut 12 can freely rotate about the central axis 24 with respect to the washer 14 and the shell 16. For instance, with respect to at least one embodiment, the through hole 60 of the shell 16 is less than the diameter of the flange 20 of the nut 12 such that the head 18 of the nut 12 may protrude through the through hole 60 and axially beyond the shell 16 while nut 12 is retained within the shell 16. In other words, the through hole 60 and inner diameter 74 of base wall 68 (i.e., the upper portion of the s-shaped section) are arranged to consider any manufacturing variations (i.e., width across the corners of the nut, the flange diameter, the flange thickness, shape of the frustrum, or other related manufacturing inconsistencies) that may exist in the nut 12 so that its ability to freely rotate may be unaffected while retaining the nut 12 to the washer 14 in a second direction 92. Maintaining the first skirt inner diameter 86 of the shell 16 may be desirable so that the nut through hole 22 and the through hole 60 of the shell 16 may be coaxial while still allowing the nut 12 to freely rotate about the central axis 24 within the shell 16. Additionally, maintaining the diameter 86 may also be desirable so that the nut 12 is axially movable between the lower surface 72 of the base wall 68 and the first surface 46 of the washer 14.

With reference to FIG. 6, the nut 12 and washer 14 are illustrated in contact with each other but the washer 14 is not swaged or staked to the nut 12 and the nut 12 is not swaged or staked to the washer 14. In other words, with the exception of friction during fastening, the washer 14 may not affect the ability of the nut 12 to rotate about the central axis 24 within the shell 16. The first skirt 78 and the second skirt 84 may maintain concentricity of the nut through hole 22 and the through hole 44 the washer 14. The first surface 46 of the washer 14 and the lower surface 38 of the nut 12 each include a surface area, and the surface area of the first surface 46 of the washer 14 may be greater than the surface area of the lower surface 38 of the nut 12.

With continued reference to FIG. 6, the second bend 80 (i.e., lower portion of the s-shaped section) of the shell 16 may be desirable to maintain an axial distance 94 parallel to the central axis 24 between the lower surface 72 of the base wall 68 and an area where the washer 14 contacts the second bend 80. In the present illustrative embodiment, the axial distance 86 between the base wall 68 and the first surface 46 of the washer 14 is greater than the thickness 40 of the flange so that the nut can move axially between the lower surface 72 of the base wall 68 and the first surface 46 of the washer 14, for example.

As shown in FIG. 6, the second skirt 84 extends upwardly from the bottom surface 62 toward the top surface 58 and axially retains the washer 14 to the nut 12 in a first direction 96 (i.e., a direction opposite the second direction 92). The second bend 80, the third bend 82, and the second skirt 84 of the shell 16 are arranged such that the second surface 48 of the washer 14 may extend at least partially beyond the bottom surface 62 of the shell 16 and may provide a contact surface for an irregular machined surface, for example. The second skirt 84 may be rolled radially toward the central axis 24 to retain the washer 14 between the second bend 80 and the second skirt 84. Additionally, or in the alternative, one or more areas of the second skirt 84 of the shell 16 may be crimped radially inwardly toward the central axis 24 to retain the washer 14 between the second bend 80 and the second skirt 84.

As used in this patent application, the terminology "for example," "for instance," "like," "such as," "comprising," "having," "including," and the like, when used with a listing of one or more elements, is open-ended, meaning that the listing does not exclude additional elements. Likewise, when preceding an element, the articles "a," "an," "the," and "said" mean that there are one or more of the elements. Moreover, directional words such as front, rear, top, bottom, upper, lower, radial, circumferential, axial, lateral, longitudinal, vertical, horizontal, transverse, and/or the like are employed by way of example and not limitation. As used herein, the term "may" is an expedient merely to indicate optionality, for instance, of an element, feature, or other thing, and cannot be reasonably construed as rendering indefinite any disclosure herein. Other terms are to be interpreted and construed in the broadest reasonable manner in accordance with their ordinary and customary meaning in the art, unless the terms are used in a context that requires a different interpretation.

Finally, the subject matter of this application is presently disclosed in conjunction with several explicit illustrative embodiments and modifications to those embodiments, using various terms. All terms used herein are intended to be merely descriptive, rather than necessarily limiting, and are to be interpreted and construed in accordance with their ordinary and customary meaning in the art, unless used in a context that requires a different interpretation. And for the sake of expedience, each explicit illustrative embodiment and modification is hereby incorporated by reference into one or more of the other explicit illustrative embodiments and modifications. As such, many other embodiments, modifications, and equivalents thereto, either exist now or are yet to be discovered and, thus, it is neither intended nor possible to presently describe all such subject matter, which will readily be suggested to persons of ordinary skill in the art in view of the present disclosure. Rather, the present disclosure is intended to embrace all such embodiments and modifications of the subject matter of this application, and equivalents thereto, as fall within the broad scope of the accompanying claims.

The invention claimed is:

1. A fastener comprising:
   a nut including
      a head,
      a flange extending radially away from the head; and
      a nut through hole having a central axis extending therethrough;
   a washer including
      a washer through hole coaxial with the nut through hole of the nut,
      a first surface adjacent the flange of the nut,
      a second surface, and
      a breakaway surface extending between the first and second surfaces; and
   a shell axially retaining the nut and the washer together, and including:
      an inner surface,
      an outer surface,
      a top surface including a through hole about the central axis,
      a bottom surface,
      a lower wall extending upwardly from the bottom surface toward the top surface, the lower wall axially retaining the washer to the nut in a first direction, and
      a s-shaped section extending between the top surface and the lower wall, including:
         an upper portion defining part of the top surface and retaining the nut to the washer in a second direction,
         a lower portion extending from the lower wall and contacting the first surface of the washer, and
         a middle portion between the upper portion and lower portion.

2. The fastener of claim 1 wherein the nut is a standard nut and does not include a boss, a collar, or a spigot extending from the nut.

3. The fastener of claim 1, wherein the nut is freely rotatable about the central axis with respect to the shell and the washer.

4. The fastener of claim 1, wherein the nut moves axially between the upper portion of the s-shaped section and the first surface of the washer.

5. The fastener of claim 1, wherein the washer includes a cylindrical portion extending between the first surface and the breakaway surface.

6. The fastener of claim 1, wherein the washer is not swaged or staked to the nut and the nut is not swaged or staked to the washer.

7. The fastener of claim 1, wherein the through hole of the washer includes a substantially uniform inner diameter and the inner diameter does not include stepped portion.

8. The fastener of claim 1, wherein the through hole of the shell and the flange of the nut each includes a diameter, the diameter of the through hole being less than the diameter of the flange.

9. The fastener of claim 1, wherein the middle portion of the s-shaped section and the lower wall maintain the concentricity of the nut through hole and the through hole of the washer.

10. The fastener of claim 1, wherein the lower wall of the shell is rolled radially inwardly toward the central axis, retaining the washer between the lower portion of the s-shaped section and the lower wall.

11. The fastener of claim 1, wherein one or more areas of the lower wall of the shell is crimped radially inwardly toward the central axis, retaining the washer between the lower portion of the s-shaped section and the lower wall.

12. A fastener comprising:

a nut including a head, a flange extending away from the head and including an upper surface and a lower surface, and a nut through hole having a central axis extending therethrough;

a washer including a first surface and a second surface, the first surface being adjacent the lower surface of the nut; and a shell including:

a bent section, comprising:

an upper portion retaining the nut within the shell;

a lower portion adjacent to and in contact with the first surface of the washer, and a middle portion extending between the upper portion and lower portion, and a lower wall extending axially away from the lower portion of the bent section, the lower wall and lower portion of the bent section retaining the washer to the shell.

13. The fastener of claim 12 wherein the flange of the nut includes a thickness between the lower surface and the upper surface, and the thickness gradually increase towards the central axis.

14. The fastener of claim 13, wherein an axial distance parallel with the central axis exists between the upper portion of the bent section and an area where the washer contacts the lower portion of the bent section, the axial distance being greater than the thickness of the flange.

15. The fastener of claim 12, wherein the nut can move axially between the washer and the upper portion of the bent section of the shell.

16. The fastener of claim 12, wherein the nut can freely rotate about the central axis with respect to the washer and the shell.

17. The fastener of claim 12, wherein the first surface of the washer and the lower surface of the nut each include a surface area, the surface area of the first surface of the washer being greater than the surface area of the lower surface of the nut.

18. The fastener of claim 12, wherein the lower wall of the shell retains the nut and the washer in a first direction and the upper portion of the bent section retains the nut in a second direction.

19. A stamped metal washer and nut retention shell, comprising:

a base wall including an upper surface, a lower surface, and a base wall inner diameter extending between the upper and lower surfaces;

a first bend extending away from the base wall;

a first skirt depending away from the first bend and including a first skirt inner diameter greater in size than the base wall inner diameter, and a first skirt outer diameter;

a second bend extending away from the first skirt;

a third bend extending away from the second bend; and a second skirt depending away from the third bend and terminating in a bottom surface of the shell, and including a second skirt inner diameter greater than the first skirt outer diameter, and a second skirt outer diameter, wherein the second skirt is straight cylindrical from the third bend to the bottom surface.

20. The stamped metal washer and nut retention shell of claim 19, wherein the second skirt is configured to be rolled radially inwardly toward a central axis to retain a washer between the second bend, the third bend, and the second skirt, wherein the bottom surface of the shell is configured to be axially recessed with respect to a bottom surface of the washer.

21. The stamped metal washer and nut retention shell of claim 19, wherein one or more areas of the second skirt is configured to be crimped radially inwardly toward a central axis to retain a washer between the second bend, the third bend, and the second skirt, wherein the bottom surface of the shell is configured to be axially recessed with respect to a bottom surface of the washer.

22. The stamped metal washer and nut retention shell of claim 19, wherein the first skirt diameter is greater than the base wall inner diameter and the second skirt diameter is greater than both the first skirt diameter and the base wall inner diameter, and the stamped metal washer and nut retention shell is composed of steel, aluminum, stainless steel, or an alloy.

23. A washer and nut retention shell, comprising:

a base wall including an upper surface, a lower surface, and a base wall inner diameter extending between the upper and lower surfaces;

a first bend extending away from the base wall;

a first skirt depending away from the first bend and including a first skirt inner diameter greater in size than the base wall inner diameter, and a first skirt outer diameter;

a second bend extending away from the first skirt;

a third bend extending away from the second bend; and a second skirt depending away from the third bend and including a second skirt inner diameter greater than the first skirt outer diameter, and a second skirt outer diameter, wherein the first skirt and the second skirt are configured to concentrically retain a nut and a washer within the shell so that the nut can freely rotate with respect to the washer and the shell.

\* \* \* \* \*